(12) United States Patent
Hasenzahl

(10) Patent No.: US 8,864,594 B2
(45) Date of Patent: Oct. 21, 2014

(54) CARNIVAL RIDE AND METHOD FOR OPERATING THE CARNIVAL RIDE

(71) Applicant: KUKA Laboratories GmbH, Augsburg (DE)

(72) Inventor: Torsten Hasenzahl, Dillingen (DE)

(73) Assignee: KUKA Laboratories GmbH, Augsburg (DE)

( * ) Notice: Subject to any disclaimer, the term of this patent is extended or adjusted under 35 U.S.C. 154(b) by 80 days.

(21) Appl. No.: 13/627,107

(22) Filed: Sep. 26, 2012

(65) Prior Publication Data

US 2013/0079167 A1     Mar. 28, 2013

(30) Foreign Application Priority Data

Sep. 28, 2011   (DE) .......................... 10 2011 083 596

(51) Int. Cl.
```
A63G 31/16    (2006.01)
A63G 1/10     (2006.01)
B25J 11/00    (2006.01)
G09B 9/02     (2006.01)
A63G 1/24     (2006.01)
G09B 9/32     (2006.01)
G09B 9/12     (2006.01)
```
(52) U.S. Cl.
CPC ................. *B25J 11/003* (2013.01); *A63G 1/10* (2013.01); *G09B 9/02* (2013.01); *A63G 1/24* (2013.01); *G09B 9/32* (2013.01)
USPC ................................ 472/60; 472/130; 434/55

(58) Field of Classification Search
CPC .............. G09B 9/00; G09B 9/02; G09B 9/04; G09B 9/12; G09B 19/16; A63G 31/00; A63G 31/16; A63G 7/00

USPC ............ 472/59–61, 130, 135; 434/29, 30, 38, 434/44, 43, 55, 58
See application file for complete search history.

(56) References Cited

U.S. PATENT DOCUMENTS 4,798,376 A     1/1989   Trumbull et al.
5,486,141 A *   1/1996   Ohga et al. ...................... 472/60
(Continued)

FOREIGN PATENT DOCUMENTS

DE    10 2004 028 261 A1   12/2005
EP         1 605 421 A2    12/2005
(Continued)

OTHER PUBLICATIONS

European Patent Office; Search Report in European Patent Application No. 12183836.1 dated Jan. 3, 2013; 7 pages.
German Patent Office; Office Action in German Patent No. 10 2011 083 596.2 dated Jul. 31, 2012; 7 pages.

*Primary Examiner* — Kien Nguyen
(74) *Attorney, Agent, or Firm* — Wood, Herron & Evans, LLP

(57) ABSTRACT

The invention relates to a carnival ride the comprises a passenger seat for receiving at least one person, a display device for displaying a film sequence and a robot with a control device and with a robotic arm to which the passenger seat can be fastened or is fastened. The film sequence comprises several successive images. The robotic arm comprises drives connected to the control device and comprises several members that can be moved relative to each other by the drives relative to axes. The control device is arranged for controlling the drives for a movement of the robotic arm so that the members have positions of the axes which positions are associated during the movement with the movement. Information about an association of at least several of the images of the film sequence with corresponding positions of the axes of the robotic arm is stored in the control device.

10 Claims, 2 Drawing Sheets

(56) References Cited

U.S. PATENT DOCUMENTS

Figure 1:
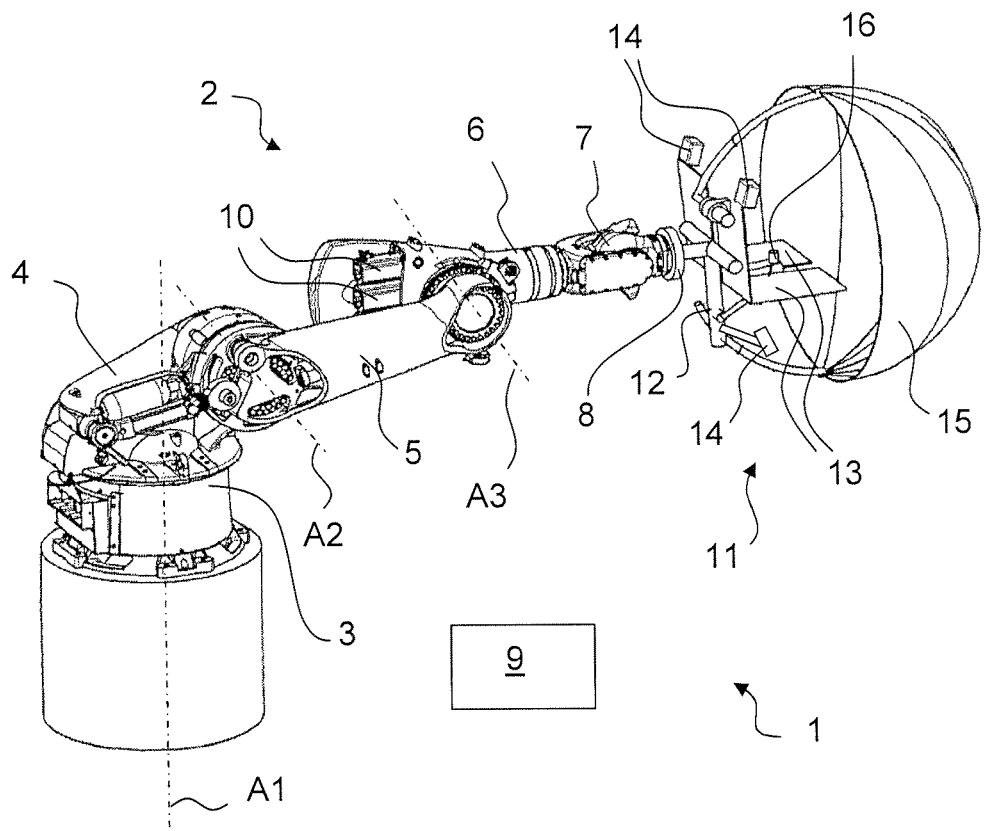

| | | | |
|---|---|---|---|
| 5,791,903 A * | 8/1998 | Feuer et al. | 434/38 |
| 6,113,500 A | 9/2000 | Francis et al. | |
| 6,776,722 B2 * | 8/2004 | De-Gol | 472/59 |
| 6,910,971 B2 * | 6/2005 | Alsenz | 472/59 |
| 7,033,177 B2 * | 4/2006 | Kim | 434/58 |
| 2001/0003102 A1 | 6/2001 | Shiina et al. | |

FOREIGN PATENT DOCUMENTS

| | | |
|---|---|---|
| EP | 1 605 421 B1 | 5/2011 |
| WO | 93/09479 A1 | 5/1993 |

\* cited by examiner

CARNIVAL RIDE AND METHOD FOR OPERATING THE CARNIVAL RIDE

The invention relates to a carnival ride with a robot and a method for operating the carnival ride.

EP 1 605 421 A2 discloses a carnival ride that comprises a robotic arm and a seat unit fastened on a fastening device of the robotic arm. An image reproduction screen is fastened on the seat unit for reproducing a film sequence which is associated with a movement of the robotic arm.

The invention has the problem of indicating an improved carnival ride that comprises a robot with a robotic arm and a control device and comprises a display device for displaying a film sequence during a movement of the robotic arm.

The problem of the invention is solved by a carnival ride comprising a passenger seat for receiving at least one person, a robot with a control device and a robotic arm that comprises drives connected to the control device and comprises several members that can move relative to each other by the drives relative to axes, and on which the passenger seat can be fastened or is fastened, and which control device is designed for controlling the drives for a movement of the robotic arm so that the members have positions of the axes associated with the movement during the movement, and a display device that is designed to display a film sequence during the movement of the robotic arm which sequence comprises several successive images, and in which information about an association of at least several of the images of the film sequence with corresponding positions of the axes of the robotic arm is stored in the control device.

The carnival ride in accordance with the invention therefore comprises the robot, which, for its part comprises the robotic arm and the control device. The robot can be designed, e.g., as an industrial robot on whose robotic arm the passenger seat is fastened or can be fastened. To this end the robotic arm comprises, for example, a suitable fastening device. The control device is provided for controlling the robotic arm so that the latter performs a given movement, as a result of which the passenger seat also performs a given movement. The movement is associated with corresponding positions of the axes of the robotic arm.

Furthermore, the carnival ride in accordance with the invention comprises the display device by means of which the film sequence associated with the movement is displayed during the movement of the robotic arm and of the passenger seat. The display device is arranged, e.g., on the passenger seat. The display device comprises, e.g., a projector and a projection screen or an image screen.

In order, e.g., to achieve prerequisites for an improved, synchronous display of the film sequence for the movement of the robotic arm the information about an association of at least several of the images of the film sequence with corresponding positions of the axes of the robotic arm is stored in the control device. Thus, not only an association of the first image with the corresponding position of the axes is known but also positions of the axes to corresponding images of the film sequence at later points in time are known. This information can be used, e.g., for a subsequent synchronizing of the displayed film sequence during the movement of the robotic arm.

For example, it can be provided that the images via which information about their associated positions of the axes is stored in the control device are provided with a marker associated with the corresponding position of the axes.

According to an embodiment of the carnival ride in accordance with the invention its control device can be set up based on the information stored in the control device to monitor a synchronous display of the film sequence of the movement of the robotic arm during the movement of the robotic arm based on the association of the images to their positions of the axes. Based on the monitoring the control device can optionally bring about a subsequent synchronization of the displayed film sequence during the movement of the robotic arm.

According to a variant of the carnival ride of the invention the control device can be adjusted to recognize a deviation of the synchronous display of the film sequence for the movement of the robotic arm if during an actual position of the axes the image actually displayed by the display device is not associated with this position of the axes or at least deviates by a maximally given number of images.

Accordingly, another aspect of the invention relates to a method for operating the carnival ride of the invention and comprises the following method steps:

moving the robotic arm in such a manner that it has positions of the axes which positions are associated with the movement during the movement, a synchronous display of the film sequence for the movement of the robotic arm, the recognition of a deviation of the synchronous display of the film sequence for the movement of the robotic arm if at an actual position of the axes the actually displayed image is not associated with this position of the axes or deviates at least by a maximally given number of images.

Thus, based on the stored information about the associations of the positions of the axes of the robotic arm to corresponding images of the film sequence a relatively simple monitoring of the synchronous displaying of the film sequence regarding the movement of the robotic arm is allowed.

If a deviation is recognized, it can then be provided for a subsequent synchronization that speed of the movement of the robotic arm is adapted as a function of the recognized deviation. Accordingly, the speed of the robotic arm can be accelerated or reduced according to the recognized deviation.

Additionally or alternatively, it can also be provided that after a recognition of a deviation a subsequent synchronization is provided for skipping over the displayed film sequence to the next image for which a position of the axes of the robotic arm is associated. Also, a repetition of the displayed film sequence after the closest previous image associated with a position of the axes of the robotic arm is possible.

According to a variant of the carnival ride of the invention its control device is arranged to interrupt the movement of the robotic arm outside of the program. To this end the carnival ride, in particular its passenger seat, can have an emergency switch. It can be provided that the movement is continued after such an interruption outside of the program.

In order to create the prerequisites that after the continuation of the movement of the robotic arm the remaining film sequence can be displayed synchronously with the movement, according to an embodiment of the carnival ride of the invention its control device is arranged in such a manner as to determine, after a non-planned interruption of the movement, the part of the film sequence that was displayed up to the interruption already by the display device and to subsequently determine the image of the film sequence that is associated with a position of the axes and in particular which image is the closest to the last image displayed before the interruption by the display device. The corresponding position of the axes can be before or also after the interruption of the film sequence.

In order to continue the movement of the robotic arm synchronously with the film sequence, according to an embodiment of the carnival ride of the invention its control device is arranged so as to determine the position of the axes that is associated with the determined image and to control the drives of the robotic arm in such a manner that the robotic arm assumes the determined position of the axes and brings about a display of the film sequence, beginning with the determined image, by means of the display device.

Accordingly, another aspect of the invention relates to a method for operating the carnival ride in accordance with the invention and comprising the following method steps:

moving the robotic arm in such a manner that it has positions of the axes which positions are associated with the movement during the movement, a synchronous display of the film sequence for the movement of the robotic arm, non-planned interruption of the movement of the robotic arm, after the non-planned interruption of the movement of the robotic arm the determining of that part of the film sequence that had already been displayed up to the interruption, determination of the image of the film sequence which image is associated with a position of the axes and in particular which image is the closest to the last image displayed before the interruption of the movement of the robotic arm, determination of the position of the axes that is associated with the determined image, movement of the robotic arm into a position corresponding to the determined position of the axes and continuation of the movement of the robotic arm, and continuation, beginning with the determined image, of the display of the film sequence.

According to the carnival ride in accordance with the invention certain defined sequence points or markers, optionally with a theoretical position signal of the particular robot position, i.e., positions of the axes of the robotic arm especially in the control device, are optionally deposited in the film or in the film sequence.

The control or the PLC, i.e. the control device optionally recognizes an abortion sequence, determines the executed sequences during the standstill and calculates the new theoretical position (synchronized-on position) for a possible new start synchronously with the film or the film sequence. That is, the robot automatically travels after the "continue" signal to the next possible synchronized-on position.

Additionally or alternatively, the control (or PLC), i.e., the control device can be designed in such a manner as to recognize whether the film or the film sequence runs synchronously with the movement. For this, e.g., defined sequence points or markers are deposited with a theoretical position signal of the particular robot position (positions of the axes), constantly monitored and upon deviation, e.g., the robot speed is adapted to the synchronizing-on or, for example, the film sequences are skipped over to the next possible synchronizing-on position.

Figure 2:
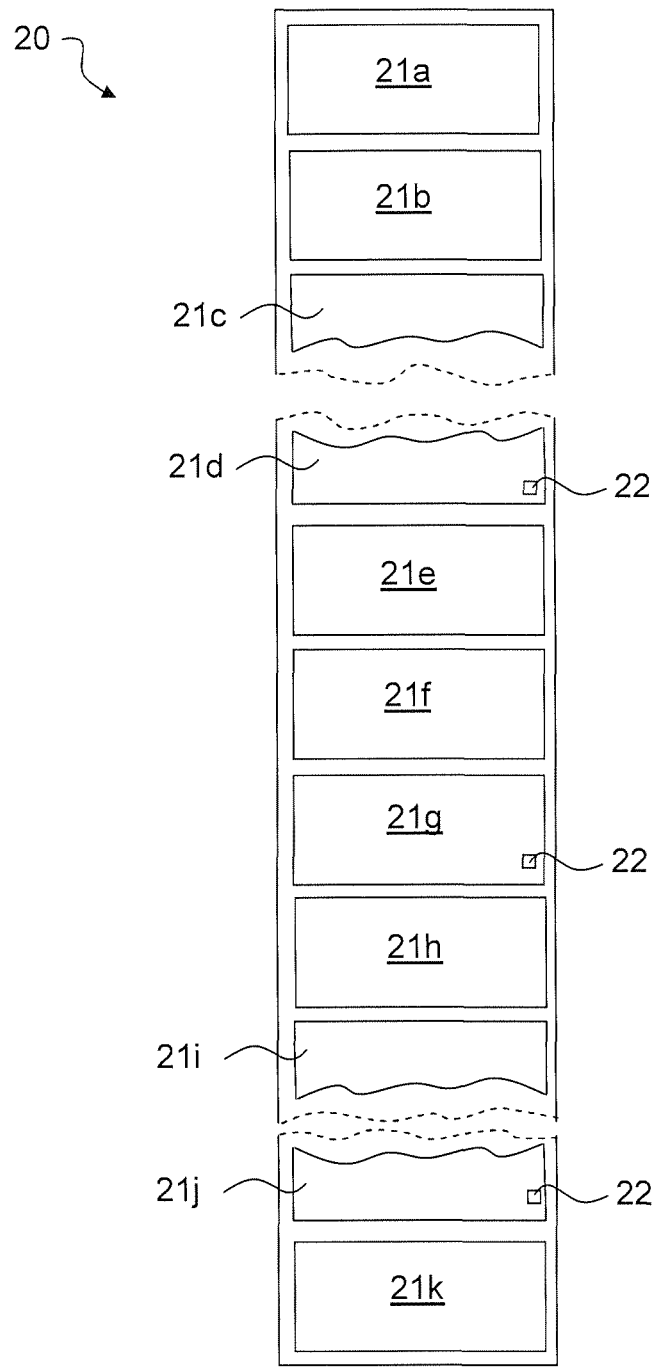

An exemplary embodiment of the invention is represented by way of example in the attached schematic figures. In the figures:

FIG. 1 shows a carnival ride with a robotic arm and a passenger seat arranged on the robotic arm, and FIG. 2 shows a film sequence.

FIG. 1 shows a perspective view of a carnival ride 1 that comprises a passenger seat 11 and a robot with a robotic arm 2 and with a control device 9.

In the case of the present exemplary embodiment the robotic arm 2 comprises several successively arranged members connected by articulations. The members are in particular a stationary or movable frame 3 arranged, e.g., on a base and a carousel 4 rotatably mounted relative to the frame 3 about a vertically running axis A1. Other members of the robotic arm 2, are, in the case of the present exemplary embodiment, a rocker arm 5, a crossbar 6, and a preferably multi-axis robotic hand 7 with the fastening device 8 to which the passenger seat 11 is fastened. The rocker arm 5 is mounted at the lower end, e.g., on a rocker arm support head that is not shown in detail on the carousel 4 in such a manner that it can pivot about a preferably horizontal axis A2. The crossbar 6 is mounted at the upper end of the rocker arm 5 in such a manner that it can again pivot about an axis A3 that is also preferably horizontal. This crossbar 6 carries on its end the robotic hand 7 with its preferably three axes, that are not shown in detail in FIG. 1.

In order to move the robot and/or its robotic arm 2 the robot comprises in a generally known manner drives connected to the control device that are in particular electrical drives. Only a few of the electrical motors 10 of these drives are shown in FIG. 1. A computer program runs on the control device 9 by means of which the control device 9 controls the robot in such a manner during the operation of the robot that the fastening device 8 or a so-called tool center point and therefore the passenger seat 11 execute a previously determined movement. The control device 9 optionally regulates the drives. The drives can also be regulated drives, whereby the control device 9 calculates theoretical values for the individual drives and transmits them to the drives.

In the case of the present exemplary embodiment the passenger seat comprises a frame 12 and two seats 13 fastened on the frame 12 on which two persons can sit in order to be moved by the carnival ride 1. The passenger seat 11 comprises, for example, two loudspeakers 14 fastened on the frame 12 or on the seats 13 in order to acoustically provide background music for the movement during a movement of the robotic arm 2. Furthermore, the passenger seat 11 comprises a display device for displaying a film sequence 20 shown in FIG. 2.

In the case of the present exemplary embodiment the display comprises a film projector 14 that is fastened, for example, on the frame 12 and that is arranged so as to project the film sequence 20 onto a canvas 15 fastened on the frame 12. The canvas 15 is, e.g., curved. However, for example, an image screen, in particular, at least one flat image screen can be used as display device.

The carnival ride 1 is arranged for moving the passenger seat 11 in accordance with the previously determined movement by its robotic arm 2 and controlled by the control device 9. To this end, as already explained, the control device 9 controls the drivers of the robotic arm 2 in a suitable manner.

Furthermore, it is provided that the film sequence 20 is projected during the movement of the robotic arm 2 onto the canvas 15. The film sequence 20 is associated with the movement of the robotic arm 2 or the film sequence 20 runs synchronously with the movement of the robotic arm 2. It can furthermore be provided that the control device 9 controls the robotic arm 2 in accordance with different selectable movements and that these different movements are associated with different film sequences 20. In order to associate the film sequence 20 in question with the movement, the projector 14 is connected, e.g., to the control device 9 so that the latter can control the projector 14. The at least one film sequence 20 can be stored, e.g., in the control device 9 and be transmitted for reproduction to the projector 14. The film sequence 20 can, however, also be stored in a memory or reproduction device associated with the projector 14 and connected in particular to the control computer 9.

The film sequence 20 comprises a plurality of images 21$a$-$k$ that result in the reproduced film sequence 20 when projected successively in time beginning with the image 21a onto the canvas 15. In order to allow a subsequent synchronization of the film sequence 20 relative to the movement of the robotic arm 2 even during the movement of the robotic arm 2, at least one pair of the images 21a-k, if not all, are associated with corresponding positions of the axes A1-A3 (axial positions) of the robotic arm 2 during its movement, or at least one pair of the images 21a-k, if not all, are associated with corresponding attitudes (positions and orientations) of the fastening device 8 or of the tool center points of the robotic arm 2 or of the passenger seat 11.

This is achieved in the case of the present exemplary embodiment in that a few, if not all images 21a-k are provided with a marking 22, as a result of which an unambiguous association of these images 21a-k with the corresponding positions or axial positions is achieved. This association is, e.g., deposited in the control device 9. Thus, defined sequence points of corresponding axial positions or attitudes are deposited in the film sequence 20. This association can be realized, e.g., in that the particular sequence points or markers 22 are associated with the theoretical position signals for the drives of the robotic arm 2, which position signals are associated with the axial positions or attitudes and are produced by the control device 9. This brings it about in particular that a theoretical attitude of the passenger seat 11 is unambiguously associated with a corresponding image 21a-k of the film sequence 20. The sequence points or markers 22 can be set, e.g., at certain time intervals and/or at each change of the attitude of the tool center points.

It is provided in the case of the present exemplary embodiment that the movement of the robotic arm 2 is carried out controlled by the control device 9 synchronously with the reproduced film sequence 20. To this end, in particular the movement of the robotic arm 2 is started synchronously with the film sequence 20, therefore, with its image 21a. During the movement of the robotic arm 2 in the case of the present exemplary embodiment the control device 9 controls not only the movement of the robotic arm 2 but the control device 9 also monitors whether the film sequence 20 is displayed synchronously with the movement of the robotic arm 2 on the canvas 15 or whether the movement of the robotic arm 2 is carried out synchronously with the displayed film sequence 20. To this end the control device 9 is optionally connected to the projector 14. The control device 9 is allowed to monitor the synchronous movement on the basis of the particular sequence points or markers 22 of the images 21a-k.

In the case of the present exemplary embodiment the control device 9 is furthermore arranged in such a manner as to recognize a deviation of the synchronous movement of the robotic arm 2 relative to the displayed film sequence 20 if, e.g., at an actual theoretical axial position the actually displayed image 21a-k does not correspond to or is not associated with this axial position or this attitude of the tool center points or at least deviates by a maximally given number of images 21a-k. For this, a suitable computer program runs, e.g., on the control device 9.

If the control device 9 recognizes a deviation, it is then provided in the case of the present exemplary embodiment that the control device 9 adapts the speed of the movement of the robotic arm 2 in correspondence with the deviation of the synchronization, that is, it executes the movement more rapidly or slower corresponding to the deviation. However, it is also possible to skip over the displayed film sequence 20 to the image 21a-k that has the next possible marker 22, or to repeat it after the closest previous image 21a-k that is associated with a position of the axes A1-A3 of the robotic arm 2.

Alternatively or additionally, the sequence points or markers 22 and also be used after an unplanned interruption of the movement of the robotic arm 2 to continue the movement of the robotic arm 2 with a synchronous displaying of the remaining film sequence 20.

In order to stop the movement in an unplanned manner the passenger seat 11 comprises, for example, an emergency stop switch 16 connected to the control device 9 by means of which switch the persons being transported by the passenger seat 11 can stop or interrupt the movement of the robotic arm 2. However, an unplanned interruption of the movement of the robotic arm 2 can also take place, e.g., by an automatic interruption by the control device 9.

In the case of the present exemplary embodiment, a continuation of the movement of the robotic arm 2 with a synchronic representation of the film sequence 20 is realized as follows:

After the unplanned interruption of the movement of the robotic arm 2 the control device 9 determines the part of the film sequence 20 that had already been displayed up to the interruption. That is, the control device 9 determines the images 21a-k that had already been presented up to the interruption of the movement of the robotic arm 2.

The control device 9 then determines the image 21a-k with a marker 22 that was the closest to the last-displayed image 21a-k before the interruption. This can be an image 21a-k that has not yet been shown or an image 21a-k that has already been shown.

The control device 9 subsequently determines the axial position or attitude of the tool center points that is associated with the determined image 21a-k.

If the movement of the robotic arm 2 is to be continued, the robotic arm 2 is moved into this axial position controlled by the control device 9 in that the control device 9 correspondingly controls, for example, the drives of the robotic arm 2 and transmits corresponding theoretical values to the drives.

The control device 9 subsequently controls the drives of the robotic arm 2 in such a manner that this arm continues the interrupted movement. At the same time the control device 9 controls the projector 14 in such a manner that it projects the film sequence 20, starting with the determined image 21a-k, onto the canvas 15.

The invention claimed is:

1. A carnival ride, comprising
a passenger seat for receiving at least one person,
a robot with a control device and a robotic arm that comprises drives connected to the control device and comprises several members that can move relative to each other by the drives relative to axes, and on which the passenger seat can be fastened or is fastened, and which control device is designed for controlling the drives for a movement of the robotic arm so that the members have positions of the axes associated with the movement during the movement, and
a display device that is designed to display a film sequence during the movement of the robotic arm which sequence comprises several successive images,
and in which information about an association of at least several of the images of the film sequence with corresponding positions of the axes of the robotic arm is stored in the control device.

2. The carnival ride according to claim 1, in which the images via which information about their associated positions of the axes is stored in the control device are provided with a marker associated with the corresponding positions of the axes.

3. The carnival ride according to claim 1, in which the control device is set up to monitor a synchronous display of the film sequence of the movement of the robotic arm during the movement of the robotic arm based on the association of the images with their positions of the axes.

4. The carnival ride according to claim 1, in which the control device is arranged to recognize a deviation of the synchronous display of the film sequence for the movement of the robotic arm if during an actual position of the axes the image actually displayed by the display device is not associated with this position of the axes or at least deviates by a maximally given number of images.

5. The carnival ride according to claim 4, in which the control device is arranged
   after a recognition of the deviation to adapt the speed of the movement of the robotic arm as a function of the recognized deviation,
   after a recognition of the deviation to bring about a skipping over the film sequence to the next image that is associated with a position of the axes of the robotic arm, and/or
   after a recognition of the deviation to bring about a repetition of the film sequence after the closest previous image associated with a position of the axes of the robotic arm.

6. The carnival ride according to claim 1, in which the control device is arranged to interrupt in a non-planned manner the movement of the robotic arm, to determine, after a non-planned interruption of the movement of the robotic arm, the part of the film sequence that had already been displayed by the display device, and to determine the image of the film sequence that is associated with a position of the axes and is the closest to the last image displayed before the interruption by the display device.

7. The carnival ride according to claim 6, in which the control device is arranged for determining the position of the axes that is associated with the determined image, for controlling the drives of the robotic arm in such a manner that the robotic arm assumes the determined position of the axes and continues the movement of the robotic arm, and brings about a display of the film sequence, starting with the determined image by means of the display device.

8. A method for operating a carnival ride in accordance with claim 1, comprising the following method steps:
   moving the robotic arm in such a manner that it has positions of the axes which positions are associated with the movement during the movement,
   a synchronous display of the film sequence for the movement of the robotic arm,
   the recognition of a deviation of the synchronous display of the film sequence for the movement of the robotic arm if at an actual position of the axes the actually displayed image is not associated with this position of the axes or deviates at least by a maximally given number of images.

9. The method according to claim 8, additionally, comprising the following method steps:
   after a recognition of the deviation, adaptation of the speed of movement of the robotic arm as a function of the recognized deviation, and/or
   after a recognition of the deviation, skipping over the displayed film sequence to the next image associated with a position of the axes of the robotic arm, or repetition of the displayed film sequence after the closest previous image associated with a position of the axes of the robotic arm.

10. The method for operating a carnival ride in accordance with claim 1, comprising the following method steps:
    moving the robotic arm in such a manner that it has positions of the axes which positions are associated with the movement during the movement,
    a synchronous display of the film sequence for the movement of the robotic arm,
    non-planned interruption of the movement of the robotic arm,
    after the non-planned interruption of the movement of the robotic arm the determining of that part of the film sequence that had already been displayed up to the interruption,
    determination of the image of the film sequence, which image is associated with a position of the axes and which image is the closest to the last image displayed before the interruption of the movement of the robotic arm,
    determination of the position of the axes that is regaiated with the determined image,
    movement of the robotic arm into a position corresponding to the determined position of the axes and continuation of the movement of the robotic arm, and
    continuation, beginning with the determined image, of the display of the film sequence.

* * * * *

UNITED STATES PATENT AND TRADEMARK OFFICE
CERTIFICATE OF CORRECTION

PATENT NO. : 8,864,594 B2  Page 1 of 1
APPLICATION NO. : 13/627107
DATED : October 21, 2014
INVENTOR(S) : Torsten Hasenzahl It is certified that error appears in the above-identified patent and that said Letters Patent is hereby corrected as shown below:

On the Title page, Item (57) Abstract:

Line 1 reads "The invention relates to a carnival ride the comprises a" and should read -- The invention relates to a carnival ride that comprises a --.

In the Specification:

Column 6,
Lines 1-2 read "Alternatively or additionally, the sequence points or markers 22 and also be used" and should read -- Alternatively or additionally, the sequence points or markers 22 can also be used --.

In the Claims:

Claim 10, Column 8,
Line 37 reads "determination of the position of the axes that is regaiated with the" and should read -- determination of the position of the axes that is associated with the --.

Signed and Sealed this
Eighteenth Day of August, 2015

Michelle K. Lee
*Director of the United States Patent and Trademark Office*